United States Patent
Koppers et al.

(10) Patent No.: US 11,234,422 B2
(45) Date of Patent: Feb. 1, 2022

(54) FISHING LURE WITH MOVABLE TAIL

(71) Applicant: Koppers Fishing and Tackle Corporation, Niagara-On-The-Lake (CA)

(72) Inventors: Grant Koppers, Niagara-On-The-Lake (CA); Victor Cook, Columbus, OH (US); Tobias Wiegand, Stevensville (CA); Brad Van Reenen, Niagara Falls (CA)

(73) Assignee: Koppers Fishing and Tackle Corporation, Niagara-on-the-Lake (CA)

( * ) Notice: Subject to any disclaimer, the term of this patent is extended or adjusted under 35 U.S.C. 154(b) by 213 days.

(21) Appl. No.: 16/630,126

(22) PCT Filed: Jul. 13, 2018

(86) PCT No.: PCT/IB2018/001064
§ 371 (c)(1),
(2) Date: Jan. 10, 2020

(87) PCT Pub. No.: WO2019/012335
PCT Pub. Date: Jan. 17, 2019

(65) Prior Publication Data
US 2020/0154688 A1    May 21, 2020

Related U.S. Application Data

(60) Provisional application No. 62/532,145, filed on Jul. 13, 2017.

(51) Int. Cl.
*A01K 85/18*    (2006.01)

(52) U.S. Cl.
CPC .................. *A01K 85/18* (2013.01)

(58) Field of Classification Search
CPC ........ A01K 85/16; A01K 85/18; A01K 85/00; A01K 99/00
(Continued)

(56) References Cited

U.S. PATENT DOCUMENTS 2,971,285 A * 2/1961 Murawski .............. A01K 85/16
43/35
3,218,750 A * 11/1965 Lewin .................... A01K 85/16
43/42.28
(Continued)

OTHER PUBLICATIONS

Written Opinion of PCT/IB2018/001064, dated Jan. 7, 2019.
International Search Report of PCT/IB2018/001064, dated Jan. 7, 2019.

*Primary Examiner* — Christopher P Ellis
(74) *Attorney, Agent, or Firm* — Dickinson Wright LLP; Matthew D. Powell

(57) ABSTRACT

The movable tail on a fishing lure having a flexible caudal stalk basically comprises a pair of laterally opposing sides, a plurality of fin rays, upper and lower lobes, laterally projecting central drafts and upper and lower lips, and a rear surface. The fin rays extend rearwardly from the caudal stalk on each of the opposing sides of the tail. The upper and lower lobes are disposed rearwardly of the fin rays. The central drafts are disposed rearwardly of the fin rays on the opposing sides of the tail. The upper lips extend between the central draft and the upper lobe on the opposing sides, and the lower lips extend between the central drafts and the lower lobe on the opposing sides. The rear surface extends over an area defined by the upper and lower lobes, the central drafts, and the upper and lower lips.

9 Claims, 2 Drawing Sheets

(58) Field of Classification Search
USPC .......................................................... 43/42.26
See application file for complete search history.

(56) References Cited

U.S. PATENT DOCUMENTS

| | | | | |
|---|---|---|---|---|
| 3,883,979 | A * | 5/1975 | Williams, Jr. .......... | A01K 85/16 43/42.09 |
| 5,193,299 | A * | 3/1993 | Correll .................... | A01K 85/00 43/42.24 |
| 6,182,391 | B1 * | 2/2001 | Hubbard ................. | A01K 85/00 43/42.32 |
| 6,385,896 | B1 * | 5/2002 | Thomassin ............. | A01K 85/16 43/42.03 |
| 6,460,286 | B1 * | 10/2002 | Wilson .................... | A01K 85/18 43/42.03 |
| 7,627,979 | B2 | 12/2009 | Huddleston | |
| 8,966,810 | B2 * | 3/2015 | Scott ....................... | A01K 85/00 43/42.03 |
| 9,072,286 | B1 * | 7/2015 | Rye ......................... | A01K 85/14 |
| 10,736,307 | B1 * | 8/2020 | Moore .................... | A01K 85/00 |
| 2002/0194770 | A1 * | 12/2002 | King ....................... | A01K 85/00 43/42.24 |
| 2005/0172537 | A1 * | 8/2005 | Sampson ................ | A01K 85/16 43/42.28 |
| 2010/0115822 | A1 * | 5/2010 | Huddleston ............ | A01K 85/00 43/42.1 |
| 2010/0123271 | A1 * | 5/2010 | Hobbins ................. | A01K 85/01 264/320 |
| 2018/0042206 | A1 * | 2/2018 | St. John ................. | A01K 85/00 |
| 2021/0137084 | A1 * | 5/2021 | Koppers ............. | B29C 45/1671 |

\* cited by examiner

FISHING LURE WITH MOVABLE TAIL

PRIORITY CLAIM

This application claims the priority of U.S. Patent Application No. 62/532,145 filed Jul. 13, 2017 by the same title and inventors.

TECHNICAL FIELD

The exemplary embodiments relate to artificial fishing lures and more particularly to those equipped with a tail portion that moves in a generally oscillating fashion as the lure is drawn through water.

BACKGROUND ART

Due in part to improvements in material and production, fishing lures with relatively flexible bodies have been developed over the past several years. Advances have also been made in imparting lifelike anatomical features and surface markings to these lures, so much so that some lures have evolved to look and feel much like actual baitfish. There remained, however, the problem of making lures maneuver like baitfish in the water. The swimming movement of a real fish is difficult to replicate, particularly since the lure's motive power comes from drawing it through the water on a fishing line. Of particular importance in terms of replicating swimming movement is the tail portion of the lure. U.S. Pat. No. 7,627,979 issued in December 2009 to Huddleston Deluxe, Inc. discloses a lure having a tail portion that is flexible in a lateral direction as the lure is drawn through the water. However, from the present inventor's perspective, there was a need for a tail design that imparted more realistic movement.

SUMMARY OF THE INVENTION

A movable tail on a fishing lure having a flexible caudal stalk basically comprises a pair of laterally opposing sides, a plurality of fin rays, upper and lower lobes, laterally projecting central drafts and upper and lower lips, and a rear surface. The fin rays extend rearwardly from the caudal stalk on each of the opposing sides of the tail. The upper and lower lobes are disposed rearwardly of the fin rays. The central drafts are disposed rearwardly of the fin rays on the opposing sides of the tail. The upper lips extend between the central draft and the upper lobe on the opposing sides, and the lower lips extend between the central drafts and the lower lobe on the opposing sides. The rear surface extends over an area defined by the upper and lower lobes, the central drafts, and the upper and lower lips.

DETAILED DESCRIPTION OF EXEMPLARY EMBODIMENTS

Figure 1:
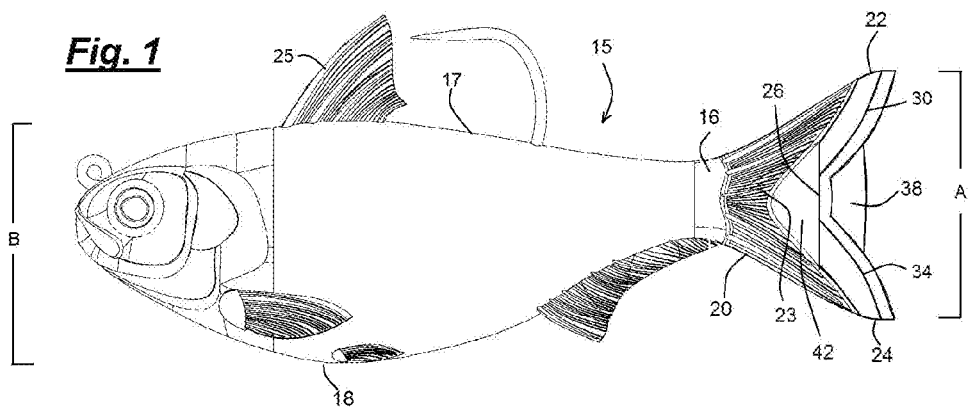
FIG. 1 is a side view of a fishing lure formed with a movable tail.
Figure 2:
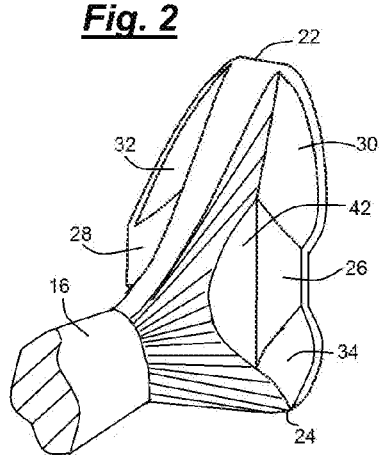
FIG. 2 is a front perspective view of the movable tail.
Figure 3:
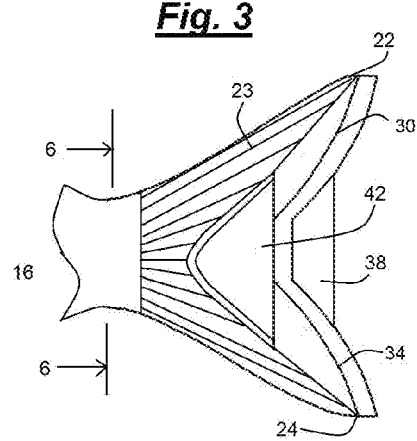
FIG. 3 is a side view of the tail.
Figure 4:
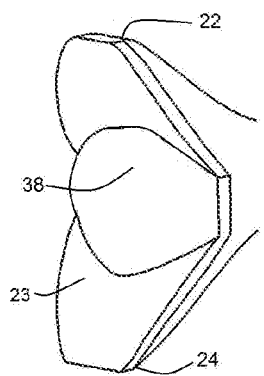
FIG. 4 is a rear perspective view of the tail.
Figure 5:
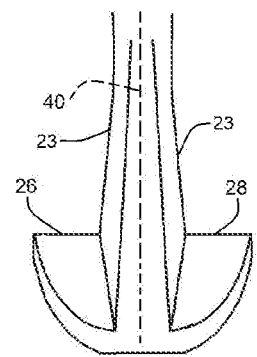
FIG. 5 is a top view of the tail.
Figure 6:
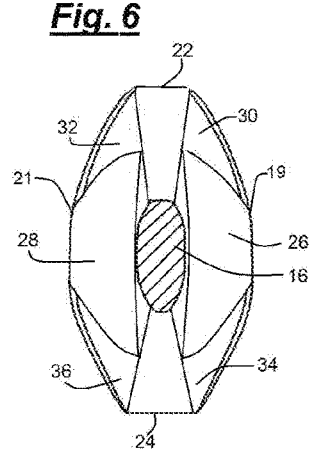
FIG. 6 is a front view of the tail.

As illustrated in FIG. 1-3, a fishing lure, generally designated 15, may be formed from a soft synthetic resin material that is shaped and detailed to resemble a bait fish, such as a Gizzard Shad. The lure may be formed with upper 17 and lower 18 body surfaces, a dorsal fin 25, a tapered and flexible caudal stalk 16, and a movable tail 20. The tail 20 may be translucent or transparent, with generally opaque, realistic looking fin rays 23 embedded therein. The tail 20 has a pair of laterally opposing sides 19, 21 (FIG. 6), and may be formed with upper and lower lobes 22, 24 that form the most rearwardly disposed portion of the tail. As shown in FIGS. 2 and 5, central drafts 26, 28 and upper and lower lips 30, 32, 34 and 36 project outwardly and laterally on the opposing sides 19, 21 of the tail, and forwardly from the upper and lower lobes at the free end of the tail. The lobes, drafts and lips define a rear surface 23 (FIG. 4). An ovoid and rounded fill area 38 is provided on a rear surface of the tail between the lobes 22, 24 (FIGS. 1, 3, 4). The fill area 38 adds weight to the tail and works in tandem with the relatively opposing, laterally projecting drafts 26, 28 to accentuate left and right swinging action of the tail as the lure moves through the water. As shown in FIG. 5, the opposing drafts 26, 28 may be approximately perpendicular to the fin rays 23 and a long axis 40 of the tail. The drafts and the upper and lower lips 30-36 increase hydrodynamic resistance and tail action. This resistance is sufficient to move the tail back and forth laterally and generate the swinging action. A relatively flat and slightly indented area 42 (FIGS. 1-3) extending forwardly from each of the drafts 26, 28 may also contribute to the tail action. As indicated in FIG. 1, a distance A between the lobes 22, 24 of the tail may be equal or greater than the maximum distance B between upper and lower surfaces, not including the dorsal fin, of the lure body. The relatively large tail is believed to enhance the realism of the lure's movement through the water.

Figure 7:
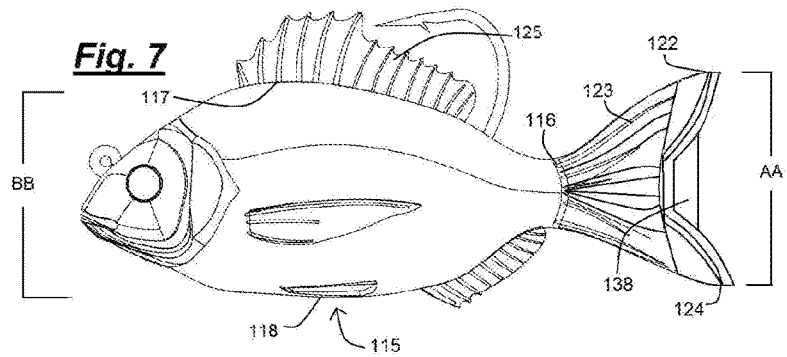
FIG. 7 is a side view of a second fishing lure formed with a modified movable tail.
Figure 8:
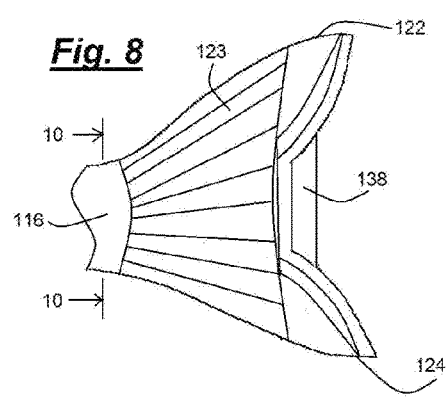
FIG. 8 is a side view of the modified tail.
Figure 9:
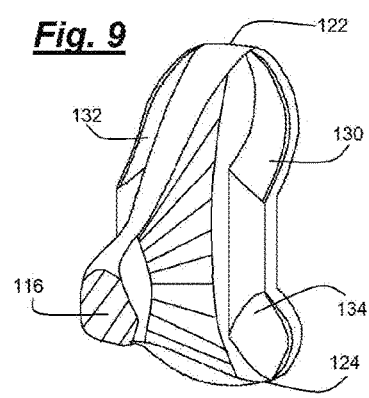
FIG. 9 is a front perspective view of the modified tail.
Figure 10:
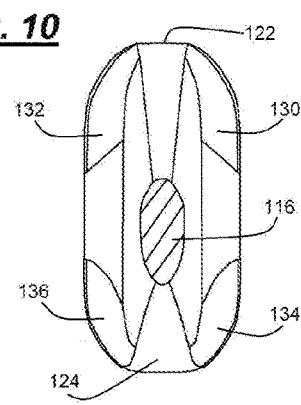
FIG. 10 is a front view of the modified tail.

As illustrated in FIGS. 7-10, the foregoing features may be modified to produce tail movement suitable for a differently shaped or sized lure, such as one resembling a Pinfish, generally designated 115. For instance, the caudal stalk 116 may be shorter or thicker than that found on the Gizzard Shad 15 illustrated in FIGS. 1-6. Likewise, the upper and lower lobes 124, 126 of the tail may extend rearwardly further than the fin rays 123. The upper and lower lips 130, 132, 134, and 136 may be more curved or convex, and the rear fill area 138 may be larger or smaller, depending upon the size of the lure. As indicated in FIG. 7, a distance AA between the lobes 124, 126 of the tail may be equal or greater than a maximum distance BB between upper and lower surfaces 117, 118, not including the dorsal fin 125, of the lure body.

The invention claimed is:

1. A movable tail on a fishing lure having upper and lower body surfaces, a dorsal fin, and a flexible caudal stalk, said tail comprising:
    a pair of laterally opposing sides;
    a plurality of fin rays extending rearwardly from the caudal stalk on each of the opposing sides of the tail;
    an upper lobe and a lower lobe disposed rearwardly of the fin rays;
    a laterally projecting central draft disposed rearwardly of the fin rays on each of said opposing sides;
    a laterally projecting upper lip extending between the central draft and the upper lobe on each of said opposing sides;

a laterally projecting lower lip extending between the central drafts and the lower lobe on each of said opposing sides; and a rear surface extending over an area defined by the upper and lower lobes, the central drafts, and the upper and lower lips.

2. The movable tail according to claim 1, wherein each of the central drafts extends generally perpendicularly to the fin rays.

3. The movable tail according to claim 1, wherein the upper and lower lobes are the most rearwardly disposed portions of said tail.

4. The movable tail according to claim 1, wherein the upper lips extending between the central drafts and the upper lobes are curved.

5. The movable tail according to claim 1, wherein the lower lips extending between the central drafts and the lower lobes are curved.

6. The movable tail according to claim 1, wherein the rear surface is provided with a centrally disposed fill area.

7. The movable tail according to claim 1, wherein the upper and lower lobes, the central drafts, and the upper and lower lips are translucent or transparent.

8. The movable tail according to claim 1, wherein a generally flat and slightly indented area is disposed between the fin rays and the central draft on each side of the tail.

9. The movable tail according to claim 1, wherein the distance between the lobes of the tail is equal or greater than the maximum distance between the upper and lower surfaces, excluding the dorsal fin, of the lure body.

\* \* \* \* \*